United States Patent
Rudolph et al.

[11] Patent Number: 5,357,846
[45] Date of Patent: Oct. 25, 1994

[54] TANDEM BRAKE BOOSTER

[75] Inventors: Robert S. Rudolph, Osceola; James J. Colpaert, Granger, both of Ind.

[73] Assignee: AlliedSignal Inc., Morristown, N.J.

[21] Appl. No.: 158,123

[22] Filed: Nov. 24, 1993

[51] Int. Cl.⁵ .................... F01B 19/00; F15B 9/10
[52] U.S. Cl. .................................. 92/48; 92/96; 91/376 R; 60/547.1
[58] Field of Search .............. 92/48, 49, 96, 98 R, 92/99, 101; 91/369.1, 376 R; 60/547.1

[56] References Cited

U.S. PATENT DOCUMENTS

| | | | |
|---|---|---|---|
| 3,103,855 | 9/1963 | Hager et al. | 92/48 |
| 4,474,005 | 10/1984 | Steer | 60/562 |
| 4,667,471 | 5/1987 | Fulmer et al. | 60/547.1 X |
| 4,685,299 | 8/1987 | Myers et al. | 60/547.1 |
| 4,738,186 | 4/1988 | Rossigno et al. | 91/376 R X |
| 4,778,225 | 10/1988 | Rudolph et al. | 303/114 |
| 5,096,267 | 3/1992 | Volz | 303/113 TB |
| 5,176,433 | 1/1993 | Byrnes et al. | 303/113 |
| 5,233,911 | 8/1993 | Rossigno | 91/376 R X |

FOREIGN PATENT DOCUMENTS 2230580  10/1990  United Kingdom .

Primary Examiner—Edward K. Look
Assistant Examiner—Hoang Nguyen
Attorney, Agent, or Firm—Leo H. McCormick, Jr.; Larry J. Palguta

[57] ABSTRACT

A tandem brake booster (12) having a flow path (145) between a control valve (118) and a solenoid valve (180) connected to a source of vacuum and the surrounding environment. The flow path (145) is created by first (140) and second (150) telescoping sleeves that are resiliently urged into sealing engagement with a front shell (58) and hub member (92) by a return spring (164).

7 Claims, 2 Drawing Sheets

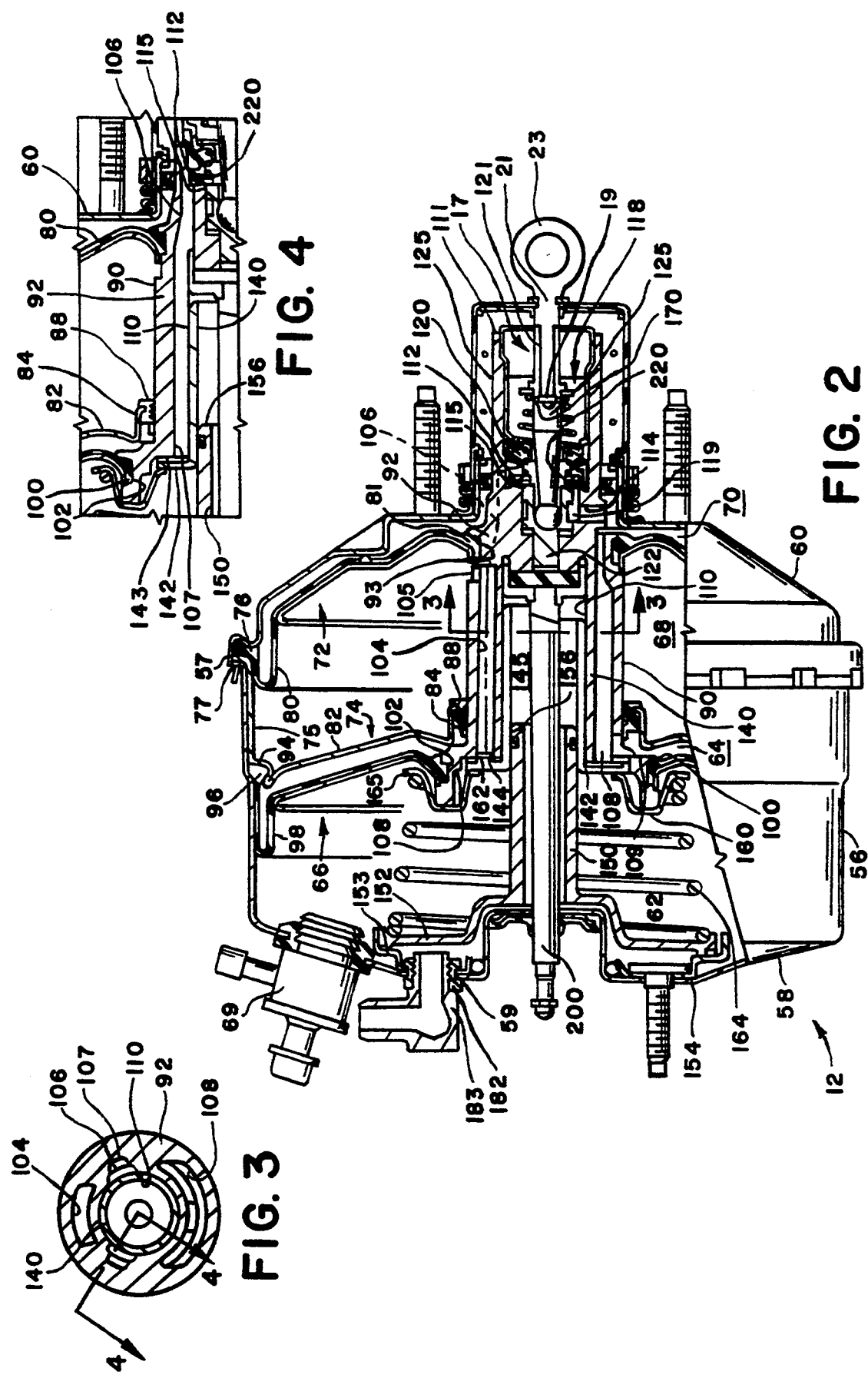

TANDEM BRAKE BOOSTER

This invention relates to a tandem brake booster for use in a brake system having an anti-skid control with traction control added thereto. The tandem brake booster has a flow path created by first and second telescoping sleeves which are urged against a front shell and a movable hub through which vacuum in a first mode of operation evacuates atmospheric pressure from rear chambers to suspend movable walls and thereafter allows a manual input no a control valve to develop an operational pressure differential to effect a brake application and in a second mode of operation on actuation of a solenoid valve by an ECU in the anti-skid control allows environmental air to develop an operational pressure differential through which selective braking is provided to synchronize the rotational spin of the drive wheel.

BACKGROUND OF THE INVENTION

Traction control circuits have been incorporated into anti-lock brake system to provide a way of synchronizing the rotational spin of the wheels of a vehicle. U.S. Pat. Nos. 4,778,225, 5,096,267 and 5,176,433 illustrate structure to accomplish such traction control in a manner acceptable most vehicle operators. The output force developed by the vacuum brake boosters in these brake systems has been achieved through the pressure differential developed between a front chamber and a rear cheer. In some instances it may be desirable to obtain greater output force from the vacuum brake booster however space constraints with respect to the location in a vehicle do not provide for any greater diameter in the movable wall. To meet such need in an increase in the output force it has been common to replace a brake booster having a single movable wall with a brake booster having two movable walls such as the disclosed in U.S. Pat. No. 5,233,911. However such a tandem brake booster would need to be modified if a traction control is incorporated into the brake system. U.S. Pat. No. 3,559,532 discloses a tandem brake booster which has been modified by placing various conduits on the outside of the housing communicate vacuum and atmosphere to the front and rear cheers. Unfortunately these additional conduits also take up space and are unprotected from damage that may occur in some vehicles. In the brake booster disclosed in U.K. Patent 2,230,580 the addition of the traction control feature was achieved through a separate actuation unit located between the tandem movable wall and as such would add additional overall length to the vacuum brake booster assembly.

SUMMARY OF THE INVENTION

The present invention overcomes a problem of external communication experienced between the front and rear chambers of a tandem vacuum brake booster which has been incorporated into a brake system to provide traction control for the drive wheels. In the instant tandem vacuum brake booster the cylindrical hub which extends from the front chamber through the rear shell has been modified to include a first passageway through which the first and second front chambers are continually connected, a second passageway and a third passageway through which the first and second rear chambers are-continually connected. A first sleeve which is located in the valve retention bore of the hub has a flange that seals the second and third passageways while an opening in the flange provides for uninterrupted communication between the first front chamber and the first passageway. A second sleeve has a disc on a first end that engages the front shell and a second end that telescopes into and sealingly engages the first sleeve. A return spring located between the first and second sleeves urges the disc into sealing engagement with the front shell and flange into sealing engagement with the hub to define a flow path between a port in the front shell connected to a solenoid valve and the second passageway. A control valve in the valve retention bore controls the communication between the second rear chamber and the second passageway to evacuate air from the first and second rear chambers. In response to a manual input force, the control valve interrupts communication of vacuum through the second passageway and initiates the direct communication of environmental air to the second rear chamber and to the first rear chamber through the third passageway. With vacuum in the first and second front chambers and environmental air in the first and second rear chambers, a pressure differential is created across the first and second walls. The pressure differential acts on the first and second walls to develop an output force that is applied to a master cylinder to pressurize fluid which is supplied to the wheel brake to effect a brake application. In response to a traction control actuation signal, the solenoid valve interrupts the communication of vacuum through the port in the front shell and initiates the communication of environmental air which is communicated along the flow path to the second passageway and past the control valve for direct distribution to the second rear chamber and first rear chamber to create a pressure differential through which an output force develops to activate the master cylinder. The pressurized fluid output of the master cylinder is selectively communicated to the drive wheels of the vehicle to synchronize the rotational spin thereof.

The invention as disclosed herein offers an advantage over known tandem vacuum brake boosters since a standard tandem brake booster could be modified by the addition of telescoping sleeves to defined sealed flow paths to add traction control to a brakes system which has an ABS system.

It is an object of this invention to provide a tandem vacuum brake booster with telescoping sleeve members which are resiliently sealed to define a flow path for normally communicating vacuum evacuate air from the first and second rear chambers and environmental air along this flow path in response to a traction control signal to independently effect a brake application.

BRIEF DESCRIPTION OF THE DRAWINGS

These advantages and objects should be apparent from reading the specification while viewing the drawings wherein:

FIG. 2 is an enlarged view of the tandem vacuum brake booster of FIG. 1;

FIG. 3 is a view taken along line 3—3 of FIG. 2; and

FIG. 4 is a view taken along line 4—4 of FIG. 3.

DETAILED DESCRIPTION OF THE INVENTION

Figure 1:
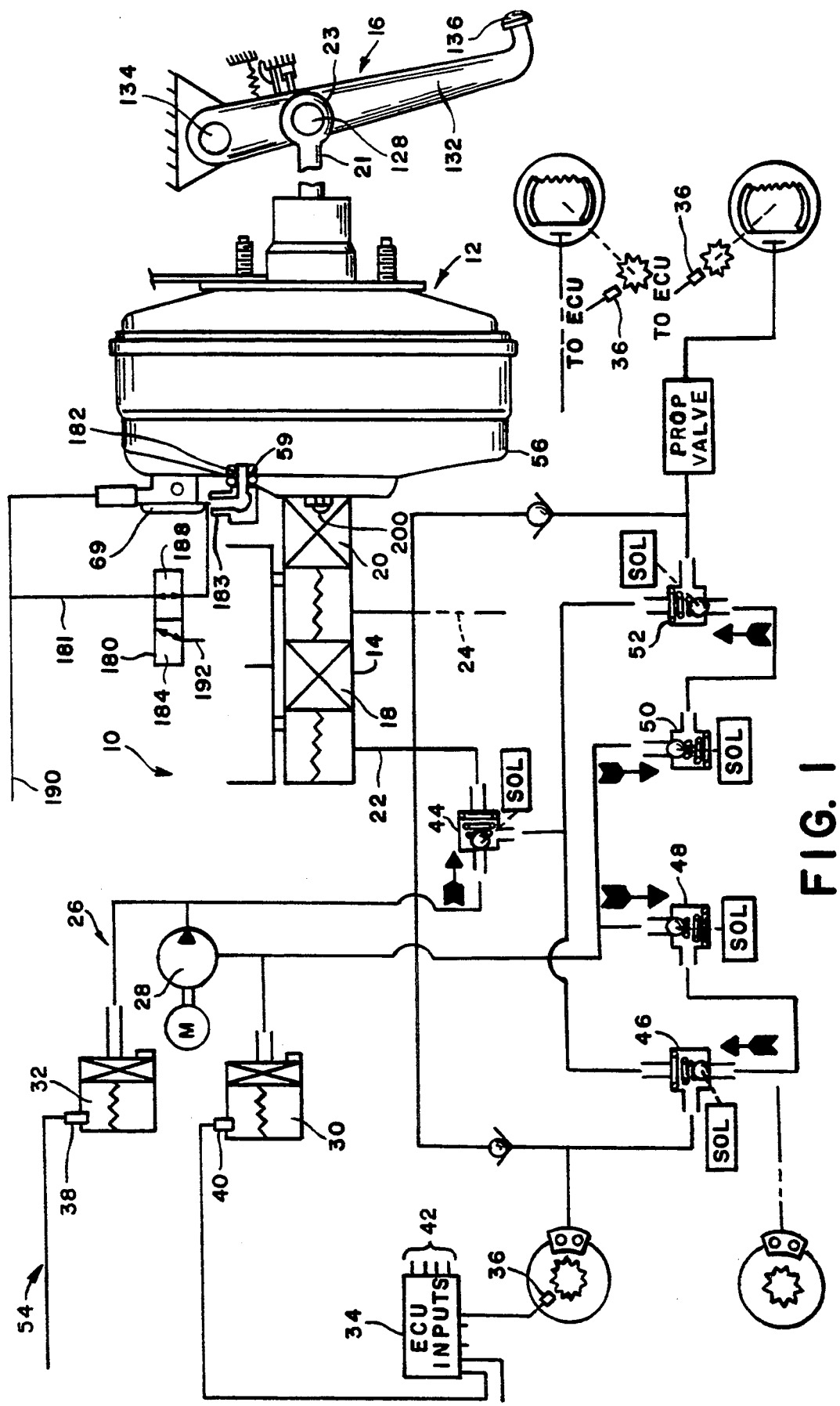
FIG. 1 is a schematic illustration of a brake system with includes a tandem vacuum brake booster made according to the present invention to add traction control to the brake system.

The brake system 10 shown in FIG. 1 includes a tandem vacuum brake booster 12 which is connected to a master cylinder assembly 14 that supplies pressurized fluid directly to the front wheels 35 and through proportioning valve 33 to the rear wheels 37 of a vehicle to effect a brake application in response to an operator input force supplied through pedal arrangement 16. The master cylinder 14 is of a type as disclosed in U.S. Pat. No. 4,474,005 wherein pressurized fluid created through movement of pistons 18 and 20 is supplied through primary and secondary circuits 22, 24 to the appropriate wheels. Further, the master cylinder 14 is connected to a pump back type anti-lock brake system 54, such as disclosed in U.S. Pat. No. 4,778,226, which includes an assembly 26 with a motor driven pump 28, sump 30, accumulator 32 and an electronic control unit (ECU) 34. The electronic control unit (ECU) 34 continually receives input signals from wheel speed sensors 36 which sense rotational spin of the individual wheel and various pressure and position switches 38, 40 associated with the sump 30 and accumulator 32. Based on information derived from these input signals, ECU 34 generates output signals at terminals 42 to control a plurality of solenoid actuated valves 44, 46, 48, 50 and 52, for simplicity only the valves for circuit 22 are illustrated in the drawing but a similar number would be required for circuit 24. During a brake application, the signals from ECU 34 control the operation of the valves in brake circuits 22 and 24 to prevent wheel skid.

The tandem vacuum brake booster 12, as best shown in FIG. 2, has a housing 56 formed by a front shell 58 and a rear shell 60. The interior of housing 56 is divided into first front chamber 62 and a first rear chamber 64 by a first wall 66 and a second front chamber 68 and a second rear chamber 70 by a second wall 72. The first rear chamber 64 is separated from the second front chamber 68 by a partition men, her 74 which includes a cylindrical portion 75 with a first flange 77 located between a bead 76 on diaphragm 80 of the rear wall 72, a disc portion 82 and a second flange 84 for retaining a seal 88 that engages a surface 90 on cylindrical hub member 92. The cylindrical portion 75 of partition member 74 which is concentric to the shell 58 is fixed within housing 56 by the twist locking structure 57 which joins shell 58 to shell 60. The first wall 66 includes a diaphragm 98 which has a first bead 96 located in a groove 94 formed in cylindrical portion 75 of partition member 74 and a second bead 100 that is retained in groove 102 in cylindrical hub member 92 to assure that the first front chamber 62 is separated from the first rear chamber 64. Similarly diaphragm 80 has a bead 81 located in groove 93 in the cylindrical hub 92 to assure that the second front chamber 68 is separated from the second rear chamber 70.

The cylindrical hub member 92 has a first end 108 connected to wall 66 and a second end 111 that extends through rear shell 60 into the surrounding environment. Cylindrical hub member 92 has a stepped axial bore 110, a first passage 104 and radial opening 105, an axial slot 107, a second passage 106 and a first radial slot 112, a second radial slot 114 and a third passage 108 and radial opening 109 for connection the first and second front chambers 62, 68 and the first and second rear chambers 64 and 70 with each other, as shown in FIGS. 2, 3 and 4.

A first sleeve 140 has a flange 142 on a first end that engages end 108 of cylindrical hub member 92 and a second end that extends into axial bore 110 to establish limits for the second passageway 106. Flange 142 has an opening 144 that is aligned with passage 104 to provide continual and uninterrupted communication between the first 62 and second 68 front chambers. Flange 142 engages the end 108 of the cylindrical hub 92 to seal the axial slot 107, see FIG. 4, and third passageway 108 from the first front chamber 62, see FIG. 2.

A second sleeve 150 has a first end with a radial disc 152 attached thereto that engages an annular hold off plate 154 attached to the front shell 58 and a second end 156 sealingly extends into the first sleeve 140 to define a flow path between a port 59 in the front shell 58 and the second passageway 106. An annular retainer 160 located on the end 108 of the cylindrical hub men, her 92 has a first lip 162 that engages the flange 142 on the first sleeve 140 and a second lip 165. A return spring 164 has a first end that is positioned on the second lip 165 and a second end that is positioned on a peripheral edge of radial disc 152 to urge face 153 on the radial disc 152 into sealing engagement with the annular hold off plate 154 and face 143 on flange 142 into sealing engagement with end 108 of the cylindrical hub member 92 to seal the first front chamber 62 from passageway 108 and slot 107 and define a flow path 145 between port 59 and passageway 106.

A control valve 118 which includes a popper men, her 120 and plunger 122 is located in the stepped axial bore 110 to control communication between radial slot 112 connected to passageway 106 and radial slot 114 connected to the second rear chamber 70. Plunger 122 is connected to the pedal assembly 16 by a two piece push rod 17. A first portion 170 of push rod 17 has a spherical member on a first end that is connected to plunger 122 and an axial bore 121 that extends from a second end to a shoulder that retains a valve return spring 123. A cross bore 125 is located in the first portion 170 adjacent the shoulder to avoid the creation of a vacuum in the axial bore 121 on movement of a first end 19 of a second portion 21 of push rod 17 in axial bore 121. The second portion 21 has an eye 23 which is located on pin 128 to provide a connection with the pedal assembly 16.

Check valve 69 is connected by line 190, see FIG. 1, to a source of vacuum, normally the intake manifold of an internal combustion engine in the vehicle to evacuate air from the first 62 and second 68 front chambers while solenoid valve 180 controls the communication of vacuum to port 59 and the flow path to the second passageway 106.

Solenoid valve 180 has a housing 184 with a chamber 188 connected to the source of vacuum by line 181 and to the surrounding environment by line 192. A projection 183 extends from housing 184 through grommet 182 located in port 59 to connect chamber 188 to the flow path of the second passageway 106. Solenoid valve 180 which is connected to and receives inputs from ECU 34 is in the inactive state under all conditions except when a traction control function is introduced into the brake system 10. When vacuum is present in chamber 188 air is evacuated from the first rear chamber 64 by flowing along a flow path consisting of radial opening 109, passageway 108, the second rear chamber 70, radial slot 114, bore portion 119, radial slot 112, passageway 106, the flow path 145 formed by the interior of the first 140 and second 150 sleeves, the space between the front shell 58 and disc 152, and port 59.

MODE OF OPERATION OF THE INVENTION

When the internal combustion engine is operating and control valve 118 is in the rest position shown in FIG. 2, vacuum directly evacuates air from the first 62 and second 68 front chambers and evacuates air from the first 64 and second 70 rear chambers through the flow path through the cylindrical hub member 92 to allow return spring 164 to position movable walls 66 and 72 in the rest position shown in FIG. 2. In the rest position, spring 123 urges a seat on plunger 122 into engagement with a face on popper valve 120 to assure that free communication can occur between passageway 106 and the second rear chamber 70.

In response to a manual input applied to pad 136, arm 132 pivots about pin 134 to provide a linear input to the two piece push rod 17. After the force of spring 123 is overcome, plunger 122 and popper 120 move together until popper 120 engages seat 115 to interrupt communication from passageway 106 and further movement moves the seat on plunger 122 away from the face on popper valve 120 to allow environment air to flow through opening 220 and into the second rear chamber 70 by way of radial slot 114 and to the first rear chamber 64 by way of passageway 108 and radial opening 109. With environmental air in the first 64 and second 70 rear chambers, a pressure differential develops across the first 66 and second 72 walls with vacuum in the first 62 and second 68 front chambers. This pressure differential acts on the first 66 and second 72 walls to develop an output force which is transferred into the cylindrical hub member 92 for communication to push rod 200 for pressurizing fluid in master cylinder 14. The pressurized fluid from master cylinder 14 is communicated to the individual brakes to effect braking in accordance with the input force applied to pad 136 to effect a brake application in a manner as described in U.S. Pat. No. 4,953,446.

When the vehicle is operating, sensors 36 continually monitor the rotational spin of the wheel and supply ECU 34 with information. If the information indicates than an anti-lock function is eminent, the ECU 34 introduces an anti-skid functional operation into brake system 10 in accordance with the teachings disclosed in U.S. Pat. No. 4,953,446.

When the manual input force applied to pad 136 terminates, return spring 123 acts on and moves push rod 17 to initially bring seat on plunger 122 into engagement with the face on popper valve 120 to terminate communication of environmental air through opening 220 to chamber 70. The force of return spring 123 thereafter moves the face on popper valve 120 away from vacuum seat 115 to allow vacuum available in passageway 106 to evacuate air from the first 64 and second 70 chambers and eliminate or dissipate the pressure differential across the first 66 and second 72 walls. As the pressure differential is eliminated, return spring 164 acts on the cylindrical hub member 92 to move the first 66 and second 72 walls toward the rest position shown in FIG. 2.

When the vehicle is moving and in the event the information obtained from input signals supplied to ECU 34 by sensors 36 indicates a difference in the rotational spin of the driving wheels of the vehicle which exceeds a predetermined value, appropriate control signals are outputted by terminals 42 to activate solenoid valve 180. Activation of solenoid valve 180 moves a plunger to interrupt communication of vacuum from line 191 and initiate the communication of environmental air to port 59 for distribution to the first 64 and second 70 rear chambers along the flow path 145 created by the interior of the first 140 and second 150 sleeves, passageway 106, radial slot 112, bore portion 119, radial slot 114, passageway 108 and opening 109 to create a pressure differential with vacuum in the first 62 and second 68 front chambers. This pressure differential develops an output force which is transmitted through push rod to operate the master cylinder 14 and pressurize fluid. This pressurized fluid is communicated to the individual drive wheel as a function of the ECU 34 to effect braking and synchronize the rotational spin thereof with a corresponding drive wheel. Once the ECU 34 determines that synchronization has been achieved, the signal to solenoid valve 180 is terminated and vacuum presented to chamber through line 191 thereafter evacuates air from the first 64 and second 70 rear chambers to allow return spring 164 to move the first 66 and second 68 walls to the rest position shown in FIG. 2.

It should be noted that during the operation of the tandem vacuum brake booster 12 to effect traction control, pedal assembly 16 remain stationary as only the first portion 125 of push rod 17 moves with the cylindrical hub member 92. Further during the movement of the cylindrical hub member 92 to transmit force to the output push rod 200, sleeve 140 telescopes into sleeve 150 to maintain the sealed relation between chamber 62 and the flow path between port 59 and passageway 106.

We claim:

1. A tandem brake booster having a front shell connected to a rear shell to define a housing, said housing being divided into first and second front and rear chambers by first and second walls, said first and second walls being connected to a cylindrical hub member that extends from said first front chamber through said rear shell, said cylindrical hub member having a bore therein and first, second and third passageways, and valve means located in said bore and responsive to an input force for selectively interrupting a fluid communication between said first and second front and rear chambers to create a first pressure differential across said first and second walls and for the development of a first output force that is communicated to operate a member, said tandem brake booster being characterized by a first sleeve having a first end and a second end, said first end of said first sleeve having a flange with an opening therein, said first sleeve being located in said bore with said flange engaging said hub to seal said second and third passageways from said first front chamber and align said opening with said first passageway to provide continual communication between said first and second front chambers, a second sleeve having a first end and a second end, said first end of said second sleeve having a radial disc attached thereto, said radial disc being urged into sealing engagement with said front shell by a return spring while said second end of said second sleeve is located in said first sleeve, said first and second sleeves forming a flow path between a port in said front shell and said second passageway in said hub, said second passageway being connected to said bore by a first radial opening, said bore being connected to said second rear chamber by a second radials opening in said hub, said second rear chamber being continually connected to said first rear chamber by said third passageway in said hub, said hub having an annular seat located between said first and second radial openings, said valve means engaging said annular seat to interrupt communication between said second passageway and said bore in response to movement by an input force to create said first pressure differential for the development of said first output force.

2. The tandem brake booster as recited in claim 1 further including an annular retainer which engages said flange on said first sleeve, said returning spring acting on said annular retainer to maintain said sealing engagement between said flange and said hub to seal said first and second passageways.

3. The tandem brake booster as recited in claim 2 wherein said first sleeve and hub cooperate to define a portion of said second passageway.

4. The tandem brake booster as recited in claim 3 wherein said first sleeve telescopes into said second sleeve on movement of said hub to communicate said first output force for activation of a master cylinder.

5. The tandem brake booster as recited in claim 4 further including a solenoid valve located in said port in said front shell, said solenoid valve controlling the communication of vacuum and environmental air to said flow path, said solenoid valve being responsive to an operational signal to allow environmental air to be communicated to said rear chamber by way of said flow path, second passageway, first and second radial openings and said third passageway to independently develop a second pressure differential through which a second output force develops to operate the master cylinder.

6. The tandem brake booster as recited in claim 5 wherein the operation of the master cylinder develops pressurized fluid which is selectively presented to the drive wheels of a vehicle to synchronize the rotational spin of drive wheels.

7. The tandem brake booster as recited in claim 6 further including a separation plate having a cylindrical body concentric to a section of said front shell with a peripheral edge located between a joint formed by said front and rear shell, a disc attached to the cylindrical body with a flange thereon that engages the hub member, said hub member moving with respect to said flange in communicating the output force to the master cylinder.

* * * * *